United States Patent [19]
van der Lely

[11] 3,971,203
[45] July 27, 1976

[54] HAYMAKING MACHINES

[76] Inventor: Cornelis van der Lely, 7, Bruschenrain, Zug, Switzerland

[22] Filed: June 20, 1974

[21] Appl. No.: 481,311

[30] Foreign Application Priority Data
June 22, 1973 Switzerland.......................... 8694/73

[52] U.S. Cl. ................................................ 56/370
[51] Int. Cl.² ......................................... A01D 79/06
[58] Field of Search .............. 56/370, 365, 368, 377

[56] References Cited
UNITED STATES PATENTS
| 3,664,106 | 5/1972 | Maugg ................................... | 56/370 |
| 3,827,224 | 8/1974 | Mulder et al. ......................... | 56/370 |

FOREIGN PATENTS OR APPLICATIONS
| 1,118,207 | 6/1968 | United Kingdom.................... | 56/370 |

Primary Examiner—Louis G. Mancene
Assistant Examiner—J. N. Eskovitz
Attorney, Agent, or Firm—Mason, Mason & Albright

[57] ABSTRACT

A haymaking machine has rake heads rotatable about upwardly extending axes. Each rake head includes a central housing mounted concentric with respect to a wheeled center shaft that affords the axis of rotation of the head. A p.t.o. is connectable to driving means that rotates the housing. Each head has support arms, the inner ends of which are pivoted on horizontal axes around the lower periphery of the housing. A tine group is pivoted to the outer end of each arm and the arm as well as its corresponding tine group are vertically movable about pivotal axes to a radial extended crop working position from a contracted and generally upright transport position. One or more spring mechanisms are associated with the pivotal axes to bias the arms and their tine groups to the transport position. Centrifugal forces overcome the spring bias when the head is rotated at operational speed.

27 Claims, 6 Drawing Figures

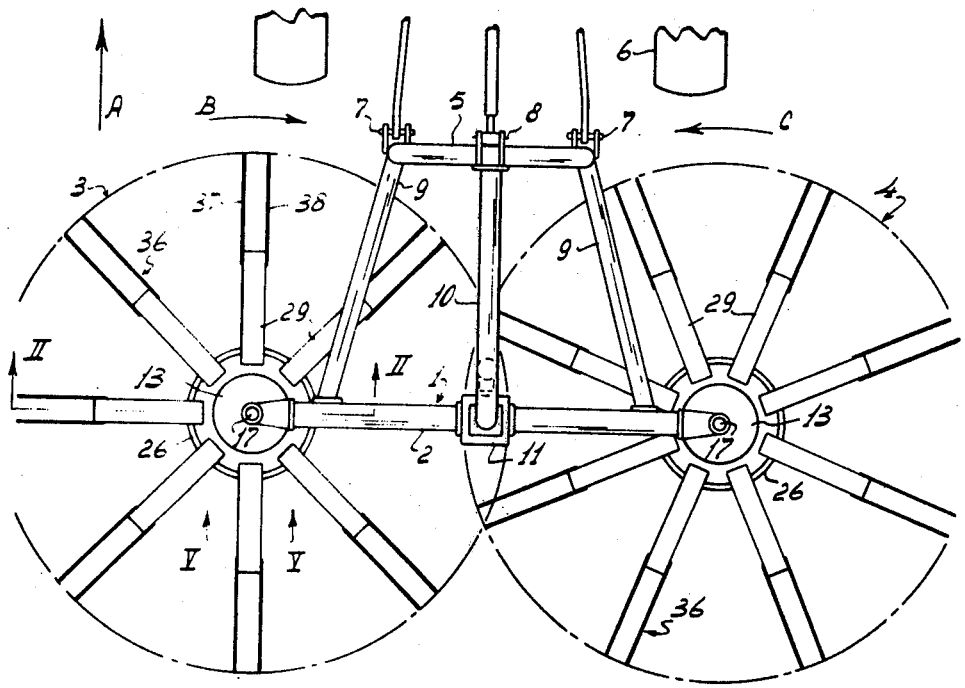
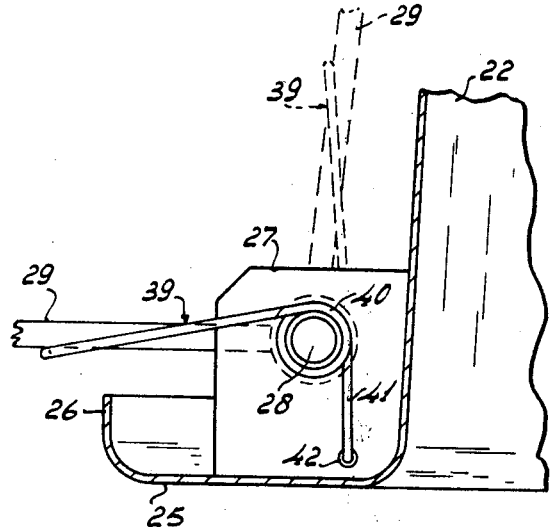
Fig. 1
Fig. 3

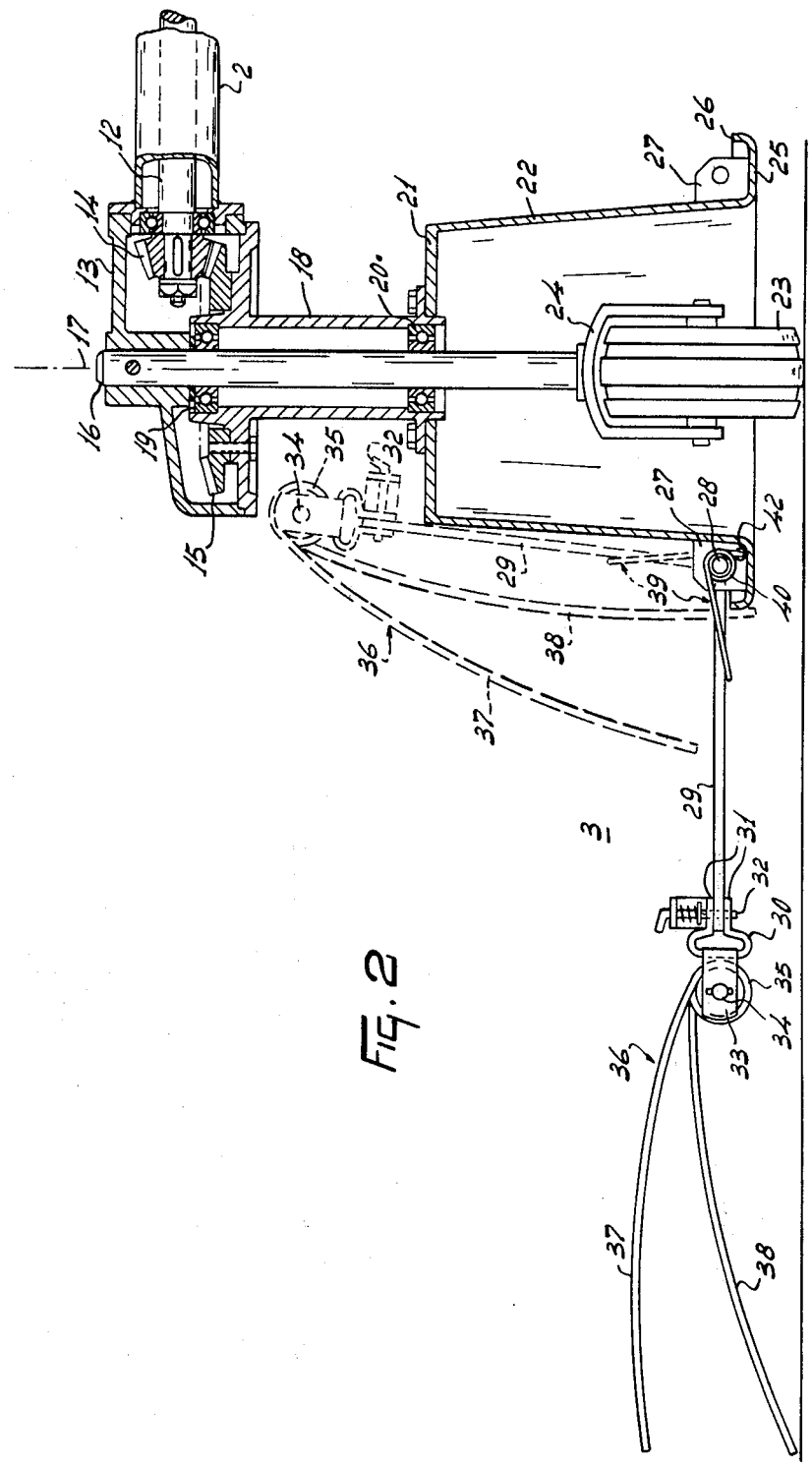

HAYMAKING MACHINES

Figure 4:
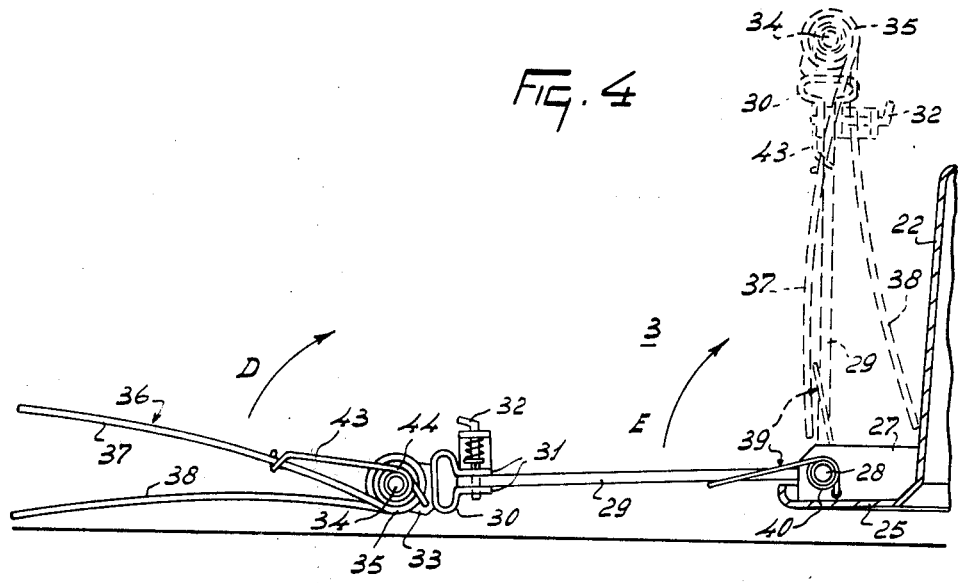
Figure 5:
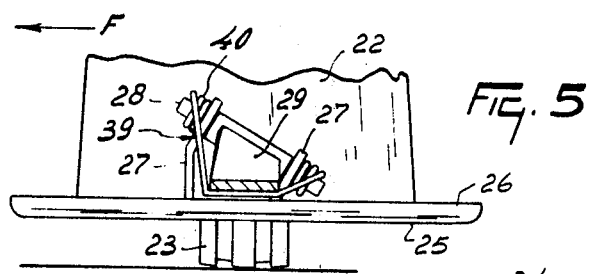

For a better understanding of the invention, and to show how the same may be carried into effect, reference will now be made, by way of example, to the accompanying drawings, in which:

FIG. 1 is a plan view of a haymaking machine in accordance with the invention connected to the rear of an agricultural tractor, FIG. 2 is a section, to an enlarged scale, taken on the line II—II in FIG. 1, FIG. 3 is a part-sectional elevation illustrating parts that can be seen in FIG. 2 to an enlarged scale and in greater detail, FIG. 4 is a similar view to FIG. 2 but illustrates an alternative construction and arrangement for some parts, FIG. 5 is a section, to an enlarged scale, taken on the line V—V in FIG. 1 but illustrates an alternative construction and arrangement for some parts, and FIG. 6 is again a similar view to FIG. 2 but illustrating a further alternative construction and arrangement of some parts of the machine.

Referring to FIGS. 1 to 3 of the drawings, the haymaking machine that is illustrated has a frame 1 which includes a main frame beam 2 that extends substantially horizontalle transverse, and normally substantially perpendicular, to the intended direction of operative travel of the machine which is indicated by an arrow A in FIG. 1 of the drawings. Two rake members or rake heads 3 and 4 are mounted at the opposite ends of the main frame beam 2 so as to be rotatable about corresponding axes that are substantially, but not truly, vertical during the use of the machine. The frame 1 includes a coupling member or trestle 5 that is of basically inverted U-shaped configuration, the coupling member or trestle 5 being constructed and arranged for connection to the three-point lifting device or hitch of an agricultural tractor 6 or other operating vehicle by way of lower fastening means in the form of apertured lugs and pivot pins 7 and upper fastening means in the form of apertured lugs and a pivot pin 8. The upper lifting link of the three-point lifting device or hitch of the tractor 6 or other operating vehicle will normally be adjustable in length in known manner and this adjustability enables the position of the machine to be varied with respect to the tractor 6 or other operating vehicle. Two tubular beams 9 interconnect lower regions of the limbs of the coupling member or trestle 5 adjacent the pivot pins 7 and opposite end regions of the main frame beam 2 close to the axes of rotation of the rake members or rake heads 3 and 4, said beams 9 being forwardly convergent in the direction A as seen in plan view (FIG. 1). A strengthening beam 10 is inclined downwardly and rearwardly with respect to the direction A from the apex of the coupling member or trestle 5, adjacent the pivot pin 8, to the top of a gear box 11 which is mounted centrally along the main frame beam 2. The longitudinal axis of the strengthening beam 10 is contained in a vertical plane of substantial symmetry of the machine that extends parallel to the direction A.

The gear box 11 has a rotary input shaft whose splined or otherwise keyed end projects forwardly therefrom in substantially the direction A beneath the strengthening beam 10 as viewed in FIG. 1 of the drawings. The projecting end of the rotary input shaft of the gear box 11 is intended to be placed in driven connection with the power take-off shaft of the agricultural tractor 6 or other operating vehicle by way of an intermediate telescopic transmission shaft of a construction that is know per se having universal joints at its opposite ends. As can be seen in FIG. 2 of the drawings, the main frame beam 2 is of tubular construction and two axially aligned shafts 12 extend substantially horizontally through that beam from opposite sides of the gear box 11 to gear boxes 13 that are fastened to the opposite ends of the beam 2. The shafts 12 are provided with bevel pinions inside the gear box 11 and the teeth of those bevel pinions are in driven mesh with the teeth of a further bevel pinion carried by the rotary input shaft that has been mentioned above. Ball bearings rotatably support the shafts 12 at opposite sides of the gear box 11 and at the junctions of the beam 2 with the gear boxes 13, one such ball bearing being visible in FIG. 2 of the drawings. The two shafts 12 serve indirectly to drive the rake members or rake heads 3 and 4 during the use of the machine. The end of each shaft 12 that projects into the corresponding gear box 13 is provided with a bevel pinion 14 whose teeth are in driving mesh with those of a bevel pinion or crown wheel 15 that is secured by bolts to an upper flange of a sleeve 18 that is rotatable around a central shaft 16 of the corresponding gear box 13 by means of upper and lower ball bearings 19 and 20. The central shaft 16 that can be seen in FIG. 2 of the drawings is, as discussed above, substantially, but not truly, vertically disposed during the use of the machine and its longitudinal axis 17 is coincident with the axis of rotation of the rake member or rake head 3. The construction and arrangement of the rake head 3 will be described in further detail below and, since the rake member or raked head 4 is substantially identical, apart from its intended direction of rotation, a separate detailed description thereof is not necessary. It will be noted from FIG. 2 of the drawings that the central shaft 16 is rigidly mounted in the corresponding gear box 13, a transverse pin establishing a rigid connection near the uppermost end of said shaft. The sleeve 18 coaxially surrounds the shaft 16 and its lowermost end carries a circular plate 21 that is perpendicular to the axis 17. The circular plate 21 forms the top of a housing 22 having the shape of a gently tapering truncated cone whose central axis is coincident with the axis 17. If the cone of which the housing 22 forms a part were complete, its apex would be located at a point on the axis 17 well above the corresponding gear box 13. The bottom of the housing 22 is open and the interior of the housing accommodates a corresponding ground wheel 23 a lowermost ground-engaging region of which projects downwardly beneath the bottom of the housing 22. The plane of rotation of the ground wheel 23 contains the axis 17, a substantially horizontal axle about the axis of which the ground wheel 23 is rotatable being connected to the overlying shaft 16 by a forked holder 24. The lowermost edge of the housing 22 is bent over to form a substantially horizontal flange 25 that is radially disposed with respect to the axis 17 and whose center of curvature coincides with that axis. The flange 25 has an upwardly bent over outermost rim 26.

Eight pairs of lugs 27 are rigidly mounted on top of the flange 25 and against the outer surface of a lower region of the housing 22 at 45° intervals around the axis 17, the two lugs 27 of each of the eight pairs being spaced apart from one another by the same distances. As can be seen best in FIG. 3 of the drawings, each lug 27 is of substantially square shape, all of them being disposed substantially radially with respect to the axis 17. The lugs 27 are rigidly connected to the housing 22 and its flange 25 by welding two neighbouring edges of each lug to those parts. Eight pivotal shafts 28 have their opposite ends entered through substantially horizontally aligned holes formed in the two lugs 27 of each pair so that the pivotal axis defined by each shaft 28 is perpendicular to the axis 17. Sleeves at the radially inner ends of eight tine support arms 29 are arranged around the eight pivot pins 28 in such a way that the eight arms 29 are turnable about the corresponding pivotal axes and extend outwardly with respect to the axis 17 when they occupy operative positions similar to those shown in FIG. 1 of the drawings and in full lines in FIGS. 2 and 3 thereof. Each tine support arm 29 is formed from a strip of ferrous sheet metal such, for example, as spring steel. The strips which principally afford the arms 29 are so arranged that their broad sides are substantially perpendicular to the axis 17 when they are occupying operative positions similar to those illustrated in FIG. 1 of the drawings and in full lines in FIGS. 2 and 3 thereof. The breadth of each of the strips that has just been mentioned in a plane substantially perpendicular to the axis 17 is several times the thickness thereof in a direction parallel to that axis, this relationship being evident from a comparison of FIG. 1 and FIG. 2 or FIG. 3 of the drawings bearing in mind that these three Figures are drawn to different scales. Brackets 30 are arranged at the outermost ends of the tine support arms 29, each bracket 30 being shaped to define an eye and two flanges 31 that lie respectively above and below the broad surfaces the strip-like arms 29 at the outermost ends thereof. Each bracket 30 has a width in a direction parallel to the corresponding pivotal shaft 28 that is the same as the width of the arm 29 to which it is connected. Holes are formed through the two flanges 31 of each bracket 30 and the arm 29 that is sandwiched between them, said holes receiving a corresponding pivot pin that is not shown in the drawings but that defines an axis that is perpendicular to the length of the corresponding arm 29 and which, during operation of the machine, is substantially parallel to the axis 17. A second set of aligned holes (not shown in the drawings) is formed with at least two holes (not shown) that are spaced apart form each other but that are located at the same distance from the corresponding pivot pin as are the set of aligned holes through the flanges 31 that have just been mentioned. The upper surface of each upper flange 31 carries a bracket in which a spring-loaded locking pin 32 is mounted, the locking pin 32 being engageable in either, or any, one of the holes formed through the corresponding arm 29 to maintain the whole bracket 30 in a corresponding angular setting about its pivotal connection with that arm.

The eye of each bracket 30 is not of circular configuration but comprises a flat part which, as seen in full lines towards the left-hand side of FIG. 2 of the drawings, is the outermost part of the bracket 30 concerned with respect to the axis 17. This outermost flat part of each sheet metal or other sheet material bracket 30 is perpendicular to the general plane of the corresponding arm 29. Each bracket 30 has a corresponding U-shaped tine holder 33 secured to it in such a way that the base of the U is disposed inside the bracket eye against the flat outermost part of that bracket that has just been discussed. The limbs of each holder 33 project outwardly away from the base thereof with respect to the axis 17 and are contained in planes which are perpendicular to the general plane of the corresponding arm 29 and to a plane containing the outermost flat part of the corresponding bracket eye. A substantially horizontal pivot pin 34 perpendicularly interconnects the limbs of each tine holder 33 in such a way as to extend substantially tangentially with respect to a circle centered upon the axis 17, at least when the machine is in operation. In this embodiment, the pivot pins 34 are substantially perpendicular to the axis 17.

Groups 36 of two tines 37 and 38 are formed integrally from single lengths of spring steel wire or rod or other resilient material and each group includes two helical coils 35 that are wound coaxially around a coresponding one of the pivot pins 34. Each helical coil 35 has a plurality of turns and the coils 35 corresponding to the two tines 37 and 38 of each group 36 are integrally interconnected by a U-shaped bend. The tines 37 and 38 extend generally outwardly with respect to the axis 17 when they are in operative positions and are then so disposed that, measured in a direction perpendicular to the longitudinal axis of the corresponding pivot pin 34 (FIG. 2), the free ends or tips of the two tines 37 and 38 are spaced apart from one another by a distance which it is preferred should not be less than one-third of the total length of one of the two tines. As viewed in FIG. 2 of the drawings, a line joining the tips of the two illustrated tines 37 and 38 in the operative position thereof illustrated in full tines extends substantially parallel to the axis 17.

As viewed in the direction of FIG. 2 of the drawings, both tines 37 and 38 of each group 36 are gently but uniformly curved away from the corresponding coils in such a way that, during operation, a tangent to the curvature of the tine 37 shown in full lines in FIG. 2 of the drawings at a point close to the corresponding coil 35 is inclined to the ground surface at an angle of substantially 30°. A similar tangent taken at a point close to the outermost free end or tip of the tine 37 is substantially horizontally disposed. On the other hand, a similar tangent to the tine 38 taken at a point close to the corresponding coil 35 is substantially horizontally disposed whereas a tangent to that tine taken at a point close to the outermost free end or tip thereof is inclined downwardly towards the ground in a direction away from the coil 35 concerned. As seen in FIG. 1 of the drawings in a direction parallel to the axis 17, the two tines 37 and 38 of each group 36 are substantially parallel to one another, the two tines being spaced apart from one another by a distance which is slightly greater than the width of the corresponding arm 29. As considered in the intended direction of rotation B of the rake member 3 or in the intended direction of rotation C of the rake member 4, the tine 38 of each group 36 is foremost with the corresponding tine 37 located behind it, the latter tine 37 being at a higher level than the leading tine 38 in the relationship which can be seen in FIG. 2 of the drawings.

A spring mechanism 39 is provided in association with each pivotal shaft 28 to bear between the corresponding tine support arm 29 and one of the corresponding pair of lugs 27 that are rigid with the housing 22. Each spring mechanism 39 is arranged to tend to turn the corresponding arm 29 upwardly about the pivotal shaft 28 concerned into a position such as is illustrated in broken lines in FIG. 3 of the drawings in which position the arm 29 bears against the housing 22 and/or extends substantially parallel to the axis 17. To this end, each spring mechanism 39 includes a coil 40 wound helically around the corresponding pivotal shaft 28, said coil 40 having one end 41 that is entered in an anchorage hole 42 in the neighbouring lug 27 and an opposite end that extends generally lengthwise alongside the associated arm 29 for some distance beyond the pivotal shaft 28 to terminate in a bent-over portion that engages beneath said arm 29. The spring mechanism 39 is of sufficient strength to turn the correspondiing arm 29 and the parts which it carries upwardly about the pivotal shaft 28 into a position such as is illustrated in broken lines in FIG. 3 of the drawings when the corresponding rake member 3 or 4 is not rotating but is not sufficiently strong to resist the centrifugal force that acts upon the arm 29 and the parts which it carries during rotation of the rake member 3 or 4 at an operational speed and which force tends to overcome the spring mechanism 39 and to bring the arm 29 to a position such as is illustrated in broken lines in FIG. 3 of the drawings when the corresponding rake member 3 or 4 is not rotating but is not sufficiently strong to resist the centrifugal force that acts upon the arm 29 and the parts which it carries during rotation of the rake member 3 or 4 at an operational speed and which force tends to overcome the spring mechanism 39 and to bring the arm 29 to a position such as is illustrated in full lines in FIG. 3 of the drawings. There are eight of the spring mechanisms 39 in respect of each of the two rake members 3 and 4, that is to say, one spring mechanism 39 for each of the tine support arms 29. It will be noted from FIG. 1 of the drawings that the distance between the axes of rotation 17 of the two rake members or rake heads 3 and 4 is such that the circles traced by the free ends or tips of the tines 37 and 38 overlap each other during the operation of the machine, the drive transmission to the two members or heads 3 and 4 being arranged in such a way that the tines corresponding to each of them "inter-mesh" in the regions of overlap to avoid fouling.

In the use of the haymaking machine which has been described, the pivot pins 7 and 8 are employed to connect the coupling member or trestle 5 to the free ends of the upper and lower lifting links of the three-point lifting device or hitch of the tractor 6 or other operating vehicle, and the rotary input shaft of the gear box 11 is placed in driven connection with the power take-off shaft of the same tractor 6 or other operating vehicle by way of the previously mentioned intermediate telescopic transmission shaft having universal joints at its opposite ends. Upon applying rotary drive to the input shaft of the gear box 11, the bevel pinions within that gear box, the shafts 12 and the parts that are contained within the gear boxes 13 cause the sleeves 18 to rotate in the opposite directions that are indicated by arrows B and C in FIG. 1 of the drawings. The rake members or rake heads 3 and 4 rotate with their sleeves 18 and their arms 29 and tine groups 36 are caused by centrifugal forces to overcome the spring mechanisms 39 so that they occupy positions similar to the position that is shown in full lines in FIGS. 2 and 3 of the drawings for one such assembly 29/36. In this position, the longitudinal axis of each arm 29 is substantially perpendicular to the corresponding axis 17 while the center of gravity of the corresponding tine group 36 is located in a position which is such that a straight line of connection between that center of gravity and the axis of the corresponding pivot pin 34 is also substantially perpendicular to the corresponding axis of rotation 17. In this regard, it should be noted that the coils 35 of each tine group 36 surround the corresponding pivot pin 34 in a freely turnable manner.

The length of each tine support arm 29 is not less than substantially 40 percent of the radius of the circular path that is traced by the outermost free end or tip of a corresponding tine 37 or 38 during operation of the machine. The tines 37 and 38 are long relative to their thickness and are of highly resilient formation. When viewed in a direction parallel to the corresponding axis 17 (FIG. 1), each tine 37 or 38 has a radial length which is not less than substantially 45 percent of the total radial distance from the axis 17 concerned to the outermost free end or tip of the tine under consideration. Each tine 37 and 38 has a length which is not less than 50 times the diameter of the spring steel wire rod from which it is preferably made. As a result, the tines will particularly readily and smoothly match undulations in the surface of the ground over which the machine travels and accumulations of hay or other crop which may be encountered. This ready matching of the tines to ground and/or crop undulations is enhanced by the pivotal mounting of the support arms 29 about the pivotal shafts 28 and by the turnability of each group of tines 36 about the corresponding pin 34 relative to the corresponding arm 29.

If a ground undulation or obstacle should be encountered by one of the assemblies of an arm 29 and a tine group 36, the support arm 29 will fold upwardly about the corresponding pivotal shaft 28 towards the central housing 22 while the tine group 36 will fold downwardly about the corresponding pin 34 towards the support arm 29 thus producing a temporary zig-zag folded configuration of the whole assembly with a resultant greatly reduced radial extent of that assembly. Immediately the undulation or obstacle has been passed, the centrifugal force that acts upon the assembly will cause it to return from the upwardly displaced more or less folded position to substantially the configuration thereof that is shown in full lines in FIG. 2 of the drawings. Hay or other crop is effectively displaced by the tine groups 36 and tends to gather against imaginary surfaces that contain the two tines 37 and 38 of each group and that, accordingly, are inclined upwardly and rearwardly away from the ground surface with respect to the directions of rotation B and C.

When the rake members or rake heads 3 and 4 are at rest, the tine support arms 29 will be turned upwardly about the pivotal shafts 28 under the action of the spring mechanisms 39 into positions such as the position that is shown in broken lines for one of them in FIG. 2 of the drawings. As the tine groups 36 are freely turnable about the pivot pins 34, gravity will cause them to hang downwardly from those pins in substantially the manner illustrated in broken lines in FIG. 2. In this position, which is suitable for inoperative transport of the machine, the arms 29 have turned upwardly about the pins 34 so as to lie against the housings 22 in substantially parallel relationship with the corresponding axes 17 while the tines 37 and 38 have turned downwardly about the pins 34 to face that broad surface of each arm 29 which, during the use of the machine, is lowermost. It will be apparent that the arrangement is such that, upon ceasing rotation of the rake members or rake heads 3 and 4, the machine automatically assumes a configuration which is suitable for inoperative transport purposes, the tines 37 and 38 being folded inwardly and the overall width of the machine being reduced to a magnitude which is little greater than that of the width of the path of travel of the tractor 6 or other operating vehicle. This will be eveident from a study of FIG. 1 of the drawings bearing in mind that, when not rotating, each of the rake members or rake heads 3 and 4 has an effective diameter which is little greater than that of its central housing 22. In the case of a machine having only a single rake member or rake head, that rake member or rake head could readily be arranged in such a way that, when not rotating, it lay entirely within the borders of the path of travel of a tractor or other operating vehicle used to transport the machine. The or each rake member or rake head automatically assumes an operative or working position upon rotation being applied thereto, the tines first turning outwardly about the pivot pins 34 after which, with an increasing speed of rotation, the arms 29 turn outwardly about the pivotal shafts 28 against the action of the spring mechanisms 39.

FIG. 4 of the drawings illustrates an alternative construction in which, in addition to the spring mechanisms 39, further generally similar spring mechanisms 43 are provided in association with each pivot pin 34 to act upon the corresponding tine groups 36. Each spring mechanism 43 incorporates a coil 44 that is wound around the pivot pin 34. One end of the spring is engaged around the upper tine 37 of the corresponding group 36 at a distance from the pin 34 (see FIG. 4 of the drawings). Each spring mechanism 43 is arranged to tend to turn the corresponding tine group 36 in an inward direction which is the clockwise direction indicated by an arrow D as seen in FIG. 4 of the drawings. Such a turning movement about the pin 34 will, it will be realised, bring the tine group 36 to a position in which it is effectively inverted to lie on top of the broad surface of the corresponding support arm 29 which is uppermost during the use of the machine. To this end, the tine holders 33 of the embodiment of FIG. 4 of the drawings are slightly modified as compared with those of the embodiment of FIGS. 1 to 3 so that the tines 37 and 38 themselves can pass by the opposite sides of the tine holders 33 during movements in the direction D, and in opposite directions, and also past the brackets 30. The spring mechanisms 43 are somewhat stronger than the spring mechanisms 39 but, nevertheless, are constructed and arranged so that the centrifugal forces that are generated during rotation of the rake members 3 and 4 will overcome them and bring the tines 37 and 38 to outwardly orientated operative positions corresponding to the position that is illustrated for one group 36 in FIG. 4. When the tine groups 36 are in operative positions of this kind, the further spring mechanisms 43 are tensed so that, generally speaking, the center of gravity of each tine group 36 will be located at a slightly higher level than the corresponding pivot pin 34 because the centrifugal forces that act during rotation do not completely overcome the effect of the spring mechanisms 43.

As the rake members or rake heads 3 and 4 come to rest after revolving at operative speeds, the tine groups 36 will first be turned upwardly about the pivot pins 34 by the further spring mechanisms 43 with the result that said spring mechanisms reach configurations of minimum, or even zero, tension. The tine groups 36 are then located more or less on top of the corresponding arms 29 in substantially inverted positions as compared with the position shown in full lines in FIG. 4. Stops that are not shown in the drawings are provided to ensure that the tine groups 36 do not turn inwardly in directions corresponding to the direction D shown in FIG. 4 of the drawings beyond positions in which the centers of gravity of those groups are located above the pivot pins 34. As previously mentioned, the spring mechanisms 43 are somewhat stronger than the spring mechanisms 39 and their relative strengths are, in fact, such that, as the rake members or rake heads 3 and 4 revolve at lower speeds, the mechanisms 43 will turn the tine groups 36 about the pivot pins 34 in directions corresponding to the direction D before the spring mechanisms 39 turn the arms 29, with the tine groups 36, upwardly about the pivotal shafts 28 in directions corresponding to the clockwise direction E that is indicated by an arrow in FIG. 4 of the drawings for one such assembly.

To sum up the effect of the construction and arrangement illustrated with reference to FIG. 4 of the drawings, during a decrease in speed of rotation about the axes 17 from an operational speed to zero, the spring mechanisms 43 first turn the tine groups 36 upwardly in directions corresponding to the direction D about the pivot pins 34 until they bear against stops (not illustrated) and lie substantially on top of the corresponding arms 29 after which, when the speed of rotation has further decreased, the spring mechanisms 39 turn the arms 29 upwardly in directions corresponding to the direction E illustrated in FIG. 4 until each assembly 29/36 occupies a position substantially corresponding to the position illustrated in broken lines in FIG. 4 for one such assembly. Thus, as in the preceding embodiment, a very considerable reduction in the diameter of each rake member or rake head 3 and 4 is automatically obtained when those members or heads 3 and 4 are not rotating, the machine thus coming automatically to a position suitable for transport on its ground wheels 23 or raised clear of contact with the ground by the three-point lifting device or hitch of the tractor 6 or other operating vehicle to which the machine is connected. An operating or working position is automatically attained by each rake member or rake head 3 and 4 when rotation thereof commences, said arms 29 and tine groups 36 turning back downwardly in directions opposite to the directions E and D in the reverse order to that described above. It will be realised that, commencing from the inoperative transport position shown in broken lines in FIG. 4 of the drawings, the tine groups 36 cannot turn outwardly about the pivot pins 34 until the arms 29 which carry them have first turned outwardly about the pivotal shafts 28 because, in the initial position, the centrifugal forces that are generated by rotation tend to maintain the tine groups 36 folded close to the arms 29 and against the aforementioned stops that are not shown in the drawings. Only after the arms 29 have turned downwardly in directions opposite to the direction E about the pivotal shafts 28 will the center of gravity of the tine groups 36 arrive above the pivot pins 34 thus allowing the centrifugal forces to turn the tine groups 36 about the pivot pins 34 in directions opposite to the direction D. It is preferred that stops (not illustrated) should be provided to determine the inoperative transport position that is indicated by broken lines for one assembly in FIG. 4 of the drawings. These stops can, for example, conveniently be located on top of the pairs of lugs 27 for abutting co-operation with the arms 29 when they have turned upwardly to the desired extents in directions corresponding to the direction E about the pivotal shafts 28. It will be seen that, in the inoperative transport position, the arms 29 extend parallel or substantially parallel to the corresponding axes 17 leaving some space between those arms and the housings 22 to accommodate the tines 37 and 38. It will be noted that the upwardly bentover rim 26 of each housing flange 25 serves as a stop which prevents the corresponding arms 29 from turning downwardly in directions opposite to the direction E through more than a few degrees beyond the position shown in full lines in FIG. 4 of the drawings. The arms 29 and their brackets 30 are thus normally prevented from striking the ground surface even in the event of a sudden upward jolt or the like occurring during operation of the machine.

In the two embodiments which have so far been described with reference to FIGS. 1 to 3 and FIG. 4 of the drawings, the pivotal shafts 28 are substantially perpendicular to the corresponding axes 17. However, in the embodiment illustrated in FIG. 5 of the drawings, the lugs 27 are constructed and arranged in such away that the longitudinal axes of the pivotal shafts make acute angles of substantially 30° with a plane that is perpendicular to the corresponding axis 17. In FIG. 5 of the drawings, the intended direction of rotation of the rake member of which part is illustrated is indicated by an arrow F and it will be noted that the upper end of each pivotal shaft 28 is disposed foremost with respect to that direction F. With this construction, in the event of the end of one of the arms 29 that is remote from the corresponding pivotal shaft 28 meeting a ground undulation or obstacle, said end not only moves upwardly but also turns rearwardly with respect to the direction F thus further reducing the risk of damage by penetration of the arm into the undulation or obstacle. The pivot pins 34 may also define axes that are inclined to planes that are perpendicular to the corresponding axes 17, said pivot pins 34 conveniently being parallel to the pivotal shafts 28 with the construction shown in FIG. 5. However, this is not essential and the pivot pins 34 may be inclined to said planes at different angles to the pivotal shafts 28.

It will be noted that, in the preceding embodiments, each of the spring structures 39 and 43 has been afforded principally by a coil spring that is tensed by tightening the winding of its coil. It is, however, emphasised that the spring structures are not essentially of this form and may, as alternatives, be afforded by helical or other tension or compression springs appropriately arranged between anchorage points on the arms 29 and the housings 22 that are spaced from the corresponding pivotal shafts 28.

Figure 6:
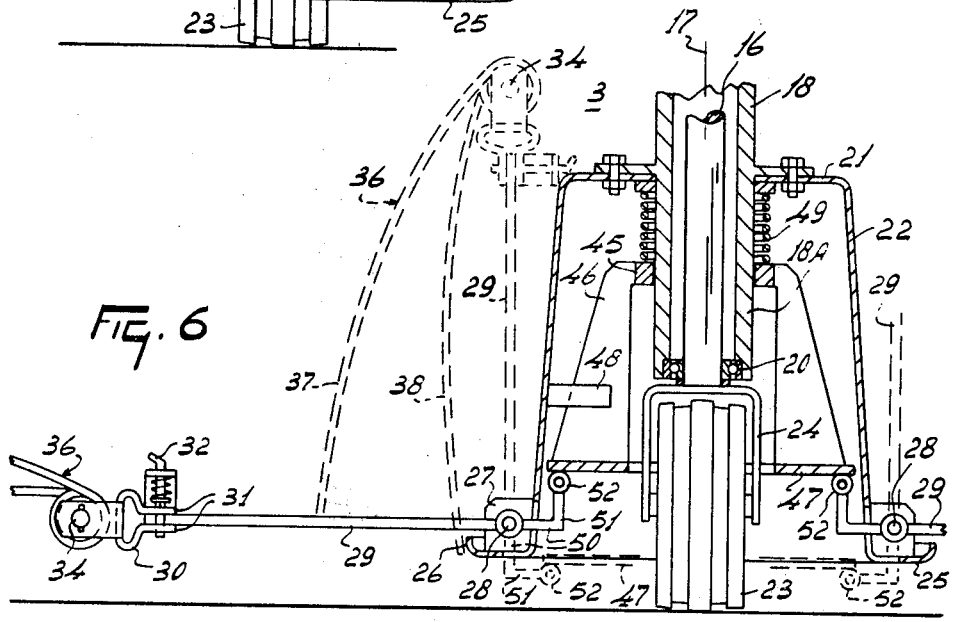

In all of the embodiments that have so far been described with reference to FIGS. 1 to 5 of the drawings, each tine support arm 29 is turned upwardly into an inoperative transport position by a corresponding spring mechanism 39 that is individual thereto. However, FIG. 6 illustrates a further alternative construction in which a single spring mechanism 49 effects upward pivotal displacement of all the arms 29 of each rake member 3 of 4. In the embodiment of FIG. 6, the sleeve 18 has a cylindrical downward extension 18A into the housing 22, the lower ball bearing 20 being mounted at the lower extremity of said extension 18A. A slip ring 45 closely and slidably surrounds the sleeve extension 18A inside the housing 22, the outer surface of said slip ring 45 being provided with a plurality, such as four, of downwardly directed arms 46 to the lowermost ends of which the upper surface of an annulus 47 is secured in such a way that the plane of said annulus 47 is perpendicular to the corresponding axis 17. One of said arms 46 is enclosed on two sides by a guide 48 rigidly secured to the inner surface of the housing 22, said guide 48 allowing the arm 46 to move upwardly and downwardly lengthwise of the corresponding axis 17 but being arranged to prevent any appreciable radial movement with respect to that axis or rotational movement with respect to the housing 22. The spring mechanism 49 takes the form of a helical compression spring that is wound around the sleeve extension 18A between the upper surface of the slip ring 45 and an abutment plate carried by the lower surface of the plate 21 at the top of the housing 22.

Each tine support arm 29 has a corresponding extension 50 which is in axial alignment with the remainder of the arm concerned but which is located at the opposite side of the corresponding pivotal shaft 28 therefrom. The lengths of the extension 50 are such that, in operative positions of the tine support arms 29, those extensions 50 are located inside a lower region of the housing 22, said extensions 50 being entered through openings formed in the wall of the housing and in its flange 25. The ends of the extensions 50 that are remote from the shafts 28 and the tine groups 36 are bent over upwardly (in operational positions of the arms 29) to form booms 51. The free upper ends of the booms 51 carry rollers 52 that are rotatable about pins affording axes that are perpendicular to the axis 17. As can be seen in FIG. 6 of the drawings, each roller 52 bears against the lower surface of the annulus 47 in both an operational or working position of the rake member 3 (shown in full lines) and an inoperative trasnport position thereof (shown in broken lines). The rollers 52 are urged against the annulus 47 by the weight of the arms 29 and the tine groups 36 which they carry and also, during rotation of the rake member 3, by the effect of centrifugal forces upon the parts which have just been mentioned. In the embodiment illustrated in FIG. 6 of the drawings, each tine group 36 is freely turnable about the corresponding pivot pin 34 but it is also possible to provide each tine group 36 with a spring mechanism 43 in the manner described and illustrated with reference to FIG. 4 of the drawings.

When the illustrated rake member 3 is not rotating, the arms 29 and the parts 50/51/52 that are connected thereto occupy the positions that are illustrated by broken lines in FIG. 6 of the drawings, the rollers 52 being in contact with an outer peripheral region of the lower surface of the annulus 47. This position is, of course, an inoperative transport position. As the rake member 3 is caused to rotate and its speed of revolution progressively increases, the centrifugal forces that are generated will act upon the tine groups 36 and their supporting arms 29 and will tend to turn them outwardly into the working or operative positions that correspond to the position illustrated for one such assembly in full lines in FIG. 6. The rollers 52 accordingly push the annulus 47 upwardly with the arms 46 and slip ring 45 against the action of the spring mechanism 49 which, in the case of the illustrated helical compression spring, is further compressed. A state of equilibrium is reached in which the force of the spring mechanism 49 that tends to push the slip ring 45 and annulus 47 downwardly is balanced by the eight rollers 52 that tend to push the slip ring 45 and annulus 47 upwardly. The arms 29 may turn so far downwardly about the pivotal shafts 28 that they come into contact with the stop that is afforded by the upwardly bent-over rim 26 of the housing flange 25 but, if this condition is not reached, the arms 29 will, in effect, be resiliently suspended. When drive to each rake member 3 and 4 is discontinued at the end of a haymaking or other crop displacement operation, the speed of rotation of the rake members rapidly decreases and the centrifugal forces which oppose each spring mechanism 49 become smaller so that the spring mechanism 49 can turn the arms 29 and the tine groups 36 which they carry back upwardly about the pivotal shafts 28 into the inoperative positions that are shown in broken lines in FIG. 6 of the drawings. Instead of being afforded by a helical compression spring 49, each spring mechanism may, in the embodiment of FIG. 6 of the drawings, be afforded by a substantially annular bellows having a valve through which a compressible fluid, such as air or some other gas, can be supplied into, and withdrawn from, the bellows. The pressurized bellows thus acts as the spring mechanism and its effect can be increased or decreased to change the positions of the arms 29 during operation of the machine by increasing or decreasing the pressure of the air or other gas contained within the bellows. With this construction, the heights of the tine groups 36 above the ground surface during operation can be varied readily. The two bellows corresponding to the two rake members 3 and 4 can conveniently be provided with a common valve so that the pressure therein will be substantially equal at all times.

Although various features of the haymaking machines that have been described and/or that are illustrated in the accompanying drawings will be set forth in the following claims as inventive features, it is emphasised that the invention is not necessarily limited to those features and that it includes within its scope each of the parts of each haymaking machine that has been described and/or illustrated in the accompanying drawings both individually and in various combinations.

What we claim is:

1. A haymaking machine comprising a frame and at least one rake head rotatably mounted on said frame to turn about a substantially vertical axis, said rake head including at least one support arm pivoted on a pivotal axis to central housing means of said head, said pivotal axis being substantially inclined to said vertical axis of rotation, the outer end of said arm having a tine group that is freely pivotable about pivot means adjacaent said end, said arm being movable from a working position to a contracted transport position and a spring mechanism connected to bias said arm about said pivotal axis to the transport position during non-rotation of said head, driving means connected to said head to rotate same during operation.

2. A haymaking machine as claimed in claim 1, wherein said support arm is turnable about the axis of a pivotal shaft that is directly connected to a central housing of said rake head.

3. A haymaking machine as claimed in claim 2, wherein the axis of said pivotal shaft is substantially perpendicular to the axis of rotation of said rake head.

4. A haymaking machine as claimed in claim 2, wherein the axis of said pivotal shaft is non-perpendicularly inclined to a plane that is perpendicular to the axis of rotation of said rake head.

5. A haymaking machine as claimed in claim 4, wherein the angle of inclination of said pivotal shaft axis has a magnitude of about 30°.

6. A haymaking machine as claimed in claim 2, wherein said spring mechanism is associated with said pivotal shaft to turn said support arm upwardly about said shaft.

7. A haymaking machine as claimed in claim 6, wherein said spring mechanism is a coil spring at least part of which is wound around said pivotal shaft.

8. A haymaking machine as claimed in claim 2, wherein, when in a transport position, said support arm extends upwardly in substantially parallel relationship with the axis of rotation of said rake head and in a position adjacent said central housing of that rake member.

9. A haymaking machine as claimed in claim 1, wherein a plurality of tine groups on corresponding arms are pivotally mounted on said head with tines extending generally outwardly with respect to the axis of rotation of said rake head during operation.

10. A haymaking machine as claimed in claim 9, wherein said tine groups are pivotally mounted on said housing with tines that extend adjacent their corresponding support arms in the contracted transport position of said rake head.

11. A haymaking machine as claimed in claim 10, wherein said tines extend downwardly and away from their connections to their corresponding support arms in the contracted transport position.

12. A haymaking machine as claimed in claim 1, wherein there are a plurality of support arms with corresponding groups of tines and each support arm has a length which is not less than about 40 percent of the radius of the circular path that is traced by the tips of the tines during operative rotation of the rake member.

13. A haymaking machine as claimed in claim 12, wherein the length of at least one tine of each tine group has a magnitude which is equal to not less than about 45 percent of the radius of the circular path that is traced by the tips of the tines during operation of said rake head.

14. A haymaking machine comprising a frame having at least one rake head supported on an upwardly extending shaft, said head having a central housing and driving means connected to said head to rotate said housing, a plurality of support arms pivoted to said housing and turntable about substantially horizontal pivotal axes from generally radial, outwardly extending working positions to upwardly extending, contracted transport positions, each arm having tine means pivoted to the outer end of that arm and said tine means being turnable about a generally horizontal axis, said arms and their corresponding tine means being movable by centrifugal forces to radial working positions and a first spring mechanism being connected to said arms to bias same into their upwardly extending transport position during non rotation.

15. A haymaking machine as claimed in claim 14, wherein a second spring mechanism interconnects a tine group of said tine means with each support arm and each tine group is pivoted its arms to turn on a second pivotal axis.

16. A haymaking machine as claimed in claim 15, wherein said second spring mechanism is connected to bias said tine group about said second pivotal axis whereby said group extends substantially parallel to its support arm in contracted transport position.

17. A haymaking machine as claimed in claim 16, wherein said support arm has a stop that limits the pivotal movement of said tine group about said second pivotal axis.

18. A haymaking machine as claimed in claim 16, wherein, when said tine group extends substantially alongside its support arm, the center of gravity of that tine group is located above said second pivotal axis when said rake head is revolving at least as fast as a predetermined speed.

19. A haymaking machine as claimed in claim 16, wherein the first and second spring mechanisms connect said arms to said housing and to said tine groups respectively whereby during a decrease in speed of rotation of said rake head from an operational speed, said second spring mechanism first biases the tine groups relative to their support arms and thereafter said first spring mechanism biases the support arms to the contracted transport position.

20. A haymaking machine as claimed in claim 19, wherein stop means on said head limits the pivoting of each support arm relative to said central housing.

21. A haymaking machine as claimed in claim 20, wherein each group has tines and the tines of each group extend downwardly away from their corresponding connections to the support arms when said rake head is in transport position.

22. A haymaking machine comprising a frame having at least one rake head supported on an upwardly extending axis of rotation, said rake head having central housing means and driving means connected to said head to rotate said housing means, a plurality of support arms pivoted to said housing means and turnable about pivotal axes inclined to said axis of rotation of the head from outwardly extending working positions to upwardly extending transport positions, each support arm having tine means connected to the outer end of that arm, said arms and their corresponding tine means being movable by centrifugal forces to said working positions, spring means positioned around said axis of rotation of the head and said spring means having a longitudinal axis in general alignment with said axis of rotation, said spring means being in association with the inner ends of said supporting arms, the outer ends of said arms together with their corresponding tine groups being turnable about said pivotal axes simultaneoussly into the transport position when the drive to said housing means is discontinued.

23. A haymaking machine as claimed in claim 22, wherein said spring means is a compression spring.

24. A haymaking machine as claimed in claim 23, wherein said spring means cooperates with a slideable member that is movable axially within said housing means and said member is operatively associated with all of the support arms.

25. A haymaking machine as claimed in claim 24, wherein said spring means and said slideable member are mounted on a sleeve that surrounds the axis of rotation of said rake head.

26. A haymaking machine as claimed in claim 22, wherein said spring means is a bellows containing a compressible fluid.

27. A haymaking machine as claimed in claim 23, wherein said compression spring is positioned on a sleeve within said housing means to bias a slideable member downwardly into contact with the inner ends of said arms, said inner ends comprising cranks that pivot and move the outer arm ends with their corresponding tine groups upwardly into the transport position during the non-rotation of said head.

* * * * *